United States Patent [19]
Crawford

[11] Patent Number: 5,278,549
[45] Date of Patent: Jan. 11, 1994

[54] WIRELINE CYCLE LIFE COUNTER

[76] Inventor: James R. Crawford, P.O. Box 30636, Lafayette, La. 70593

[21] Appl. No.: 876,926

[22] Filed: May 1, 1992

[51] Int. Cl.$^5$ ............................................. G01V 1/00
[52] U.S. Cl. .............................. 340/853.2; 340/854.1; 340/854.9; 175/45
[58] Field of Search ...................... 73/15, 1.5; 175/45; 340/853.1, 853.2, 854.1, 854.2, 854.9, 855.2; 364/422; 367/33, 69

[56] References Cited

U.S. PATENT DOCUMENTS

| | | | |
|---|---|---|---|
| 4,012,712 | 3/1977 | Nelligan | 340/18 |
| 4,028,660 | 6/1977 | Pitts, Jr. | 340/18 |
| 4,415,895 | 11/1983 | Flagg | 340/856 |
| 4,434,971 | 3/1984 | Cordrey | 364/422 X |
| 4,541,481 | 9/1985 | Lancaster | 166/65.1 |
| 4,620,189 | 10/1986 | Farque | 340/856 |
| 4,788,545 | 11/1988 | Farque | 340/856 |
| 4,790,380 | 12/1988 | Ireland et al. | 166/250 |
| 4,891,641 | 1/1990 | Gard et al. | 340/857 |
| 5,014,781 | 5/1991 | Smith | 166/66.5 |

OTHER PUBLICATIONS

Dowell Schlumberger Quality In Coiled Tubing Brochure.
Elvaco Oil Products Limited Brochure.
Hydra Rig Recording And Monitoring System Brochure.
Asep Wire Line Recorder Brochure.

*Primary Examiner*—J. Woodrow Eldred
*Attorney, Agent, or Firm*—Pravel, Hewitt, Kimball & Krieger

[57] ABSTRACT

A wireline monitor performs the following tasks:
it gives an alarm at a predetermined percentage of cycle life and can give a reading of the percentage of cycle life at any point on the wire;
an alarm sounds when the weight on the wire exceeds the rated weight;
it logs well head pressure;
it monitors the location of the end of the wireline to prevent a blow-out-preventer (b.o.p.) valve from closing and cutting the wireline and to prevent the wireline from being pulled off of a wireline tool when it reaches the top of the hole; and
it can shut down the wireline unit in response to any of the measurements which it is making.

17 Claims, 6 Drawing Sheets

WIRELINE CYCLE LIFE COUNTER

BACKGROUND OF THE INVENTION

1. Field of the Invention

The present invention relates to wireline units, and more particularly to apparatus for improving the safety and reliability of wireline units.

2. General Background of the Invention

In drilling of oil and gas wells, a wireline is often used to perform tasks such as perforating a casing and setting a gravel pack. Wireline is also used for other tasks, such as logging a well.

With use, wireline wears out and needs to be replaced, or it can break, causing whatever tool is at its lower end to fall into the well bore, along with whatever wireline is below the break. The downtime while the broken wireline and tool are being retrieved can cost an oil company thousands or even millions of dollars. Also, wireline is usually run through a blow-out-preventer (b.o.p.) valve. If there is a problem downhole (e.g., well pressure exceeding mud weight) and a blow out is imminent, the wireline is quickly retrieved and the b.o.p. valve is quickly shut. If the operator of the b.o.p. valve is nervous, he might shut the b.o.p. valve before the lower end of the wireline is above it, causing the wireline to break or possibly preventing the b.o.p. valve from closing.

Currently the use of wireline is counted by hand, as is the amount of wireline downhole. Inaccurate counting can lead to unexpected breaking of the wireline through the wireline wearing out. Also, mistakes in counting the amount of wireline downhole can cause the b.o.p. valve to be closed prematurely, damaging the valve and/or cutting the wireline. Further, if the location of the lower end of the wireline is not properly kept track of, a wireline tool attached to the lower end of the wireline may be pulled off of the wireline if the lower end of the wireline is pulled upward through an obstruction through which the tool cannot pass.

SUMMARY OF THE INVENTION

The apparatus of the present invention is a wireline monitoring unit which preferably can perform the following tasks:

it can give an alarm at a predetermined percentage of cycle life and can give a reading of the percentage of cycle life at any point on the wire;

an alarm can sound when the weight on the wire exceeds the rated weight;

it can log well head pressure;

it can monitor the location of the end of the wireline to prevent a blow-out-preventer (b.o.p.) valve from closing and cutting the wireline and to prevent the wireline from being pulled off of a tool when it reaches the top of the hole;

it can optionally print out all information about the job at the end of the job; and it can shut down the wireline unit in response to any of the measurements which it is making.

The wireline monitoring/controlling system of the present invention is a general purpose analog signal monitoring, logging, and playback system designed for use with wireline units. Major system benefits are:

enhanced job safety;
job accountability; and
elimination of most workovers due to dropping wire in the hole.

The software which can advantageously be used in the system of the present invention includes field software and office software.

The field software preferably monitors and saves real-time values of up to 12 different parameters at the job site. The parameter values may come from analog signals or calculations. The analog signals may conform to any of the following standards: $\pm 15$ mV; $\pm 50$ mV; $\pm 100$ mV; $\pm 500$ mV; $\pm 1$ V; $\pm 5$ V; and $\pm 20$ mA.

The following screens are preferably available for data display and manipulation:

bar graph representation of all points being monitored; alarm conditions can be indicated through a color change and an audible horn, for example; numeric values for each parameter are preferably shown below the bar graph;

45 minute trend plots, some with high alarm lines and some with high and low alarm lines, for all points being monitored;

a bar configuration screen (not shown) to configure bar graph names, minimum and maximum values, high and low alarm limits, etc.;

a job configuration screen (not shown) to enter information about a particular job such as company, well location, depth, etc.

a free-form text screen (not shown) to allow the operator to enter notes about the job;

a cycles vs. depth plot to indicate wire wear; and a calibration screen (not shown) used to enter calibration values for the parameters being measured.

The office software preferably provides the capability to display job data from historical files created by the field software.

The following screens (not shown) are preferably available for data display and manipulation:

a play-back screen showing bar graphs of all points being monitored; alarm conditions are preferably indicated through a color change; numeric values for each parameter are preferably shown below the bar graph; the entire job can preferably be displayed forward or backward in time by depressing function keys;

screens showing each parameter plotted versus time for the entire job or any portion of the job;

a report screen shows numeric values for each point along with the time the point was recorded; and a screen showing a textural log of all alarms and operator actions along with the time of occurrence.

The wireline monitoring/controlling system of the present invention preferably measures or calculates the following parameters: pulling force; wire depth; wellhead pressure; and wire running speed.

WireWatch ™ is a division of NPACT ™ (Nitrogen Pumping and Coiled Tubing Specialists, Inc.), P.O. Box 30636, Lafayette, La. 70593. WireWatch ™ provides wireline monitoring systems according to the present invention.

The wireline monitoring/controlling system of the present invention preferably does the following: calculates cycle life of wire, monitors weights being pulled on wire, monitors well head pressure, monitors depth, calculates running speeds on wire, can produce 45 minute trends at the job site for all points being measured, alarms to sound if any function goes over safety limits, utilizes NEMA 4× weatherproof enclosed systems, is completely portable from rig to rig, and enables monitoring of a job from a remote location over a communications link (e.g., using a modem and cellular telephone).

Benefits of the wireline monitoring/controlling system of the present invention are: it can eliminate expensive and unnecessary workovers; it can automatically record and track total runs on wire; it can plot cycles versus depth to indicate wire wear in certain spots; it can plot trends for well head pressure equalization when pulling equalizing prongs to prevent being blown up the hole; it can sound an alarm if too much weight is being pulled on the wire; it can provide a complete record of all jobs to be maintained for future reference; and it can enable a complete playback of job in bar graph, text, or trend plot format.

It is an object of the present invention to provide a

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE PREFERRED EMBODIMENT

Figure 1:
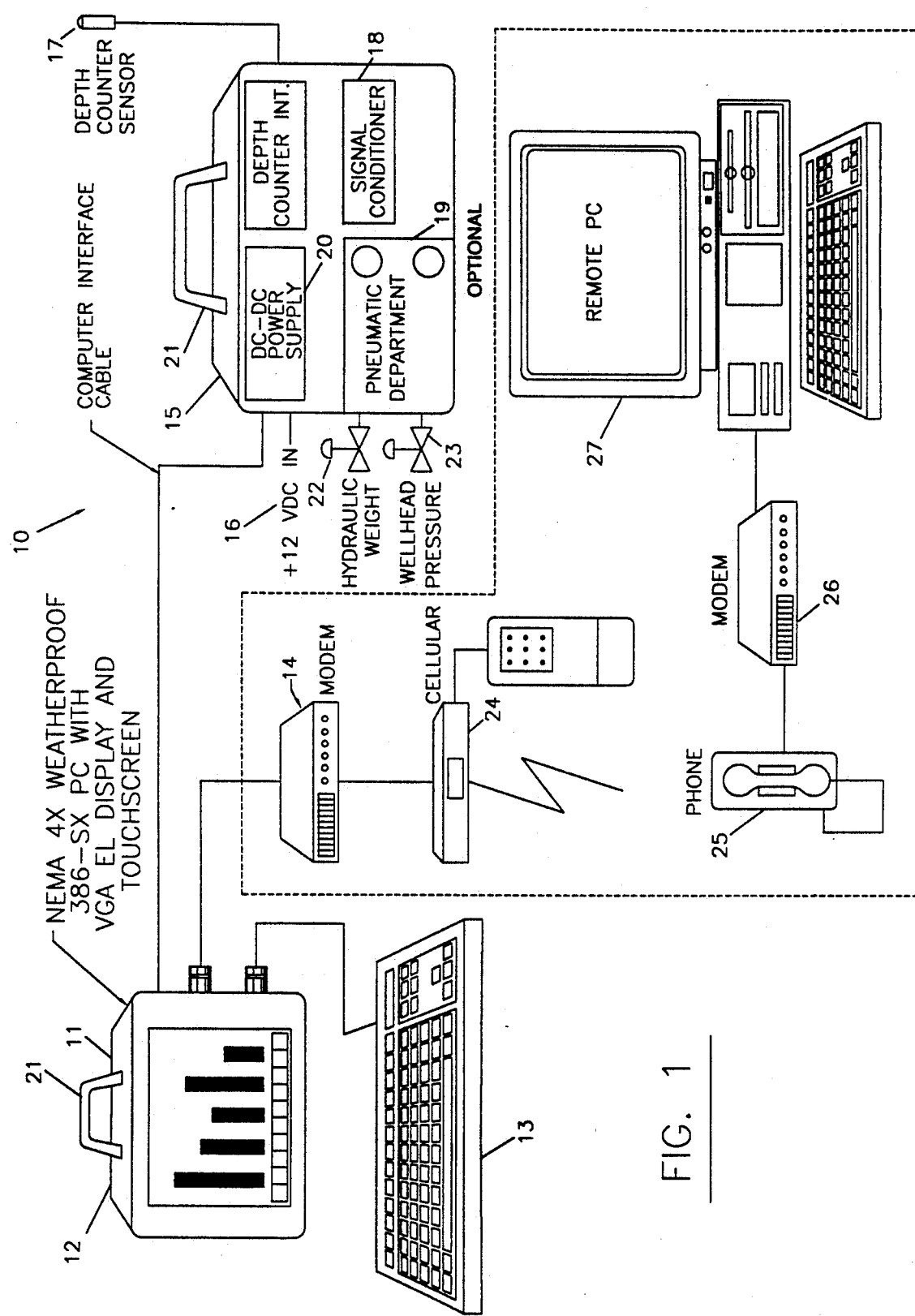
FIG. 1 is an overall view of the preferred embodiment of the apparatus of the present invention.

The apparatus 10 (FIG. 1) of the preferred embodiment of the present invention is a wireline monitoring unit which preferably performs the following tasks:

it gives an alarm at a predetermined percentage of cycle life and can give a reading of the percentage of cycle life at any point on the wire;

an alarm sounds when the weight on the wire exceeds the rated weight;

it logs well head pressure;

it monitors the location of the end of the wireline to prevent a blow-out-preventer (b.o.p.) valve from closing and cutting the wireline and to prevent the wireline from being pulled off of a tool when it reaches the top of the hole;

it can optionally print out all information about the job at the end of the job; and it can shut down the wireline unit in response to any of the measurements which it is making.

The wireline monitoring/controlling system 10 of the present invention is a general purpose analog signal monitoring, logging, and playback system designed for use with wireline units. Major system benefits are:

enhanced job safety;

job accountability; and elimination of most workovers due to dropping wire in the hole.

The software which can advantageously be used in the system of the present invention includes field software and office software.

The field software preferably monitors and saves real-time values of up to 12 different parameters at the job site. The parameter values may come from analog signals or calculations. The analog signals may conform to any of the following standards: ±15 mV; ±50 mV; ±100 mV; ±500 mV; ±1 V; ±5 V; and ±20 mA.

The following screens are preferably available for data display and manipulation:

bar graph representation of all points being monitored (FIG. 2); alarm conditions can be indicated through a color change and/or an audible horn, for example; numeric values for each parameter are preferably shown below the bar graph;

45 minute trend plots (FIG. 3), some with high alarm lines and some with high and low alarm lines, for all points being monitored;

a bar configuration screen (not shown) to configure bar graph names, minimum and maximum values, high and low alarm limits, etc.;

a job configuration screen (not shown) to enter information about a particular job such as company, well location, depth, etc.

a free-form text screen (not shown) to allow the operator to enter notes about the job;

a cycles vs. depth plot (FIG. 4) to indicate wire wear; and a calibration screen (not shown) used to enter calibration values for the parameters being measured.

The office software preferably provides the capability to display job data from historical files created by the field software.

The following screens (not shown) are preferably available for data display and manipulation:

a play-back screen showing bar graphs of all points being monitored; alarm conditions are preferably indicated through a color change; numeric values for each parameter are preferably shown below the bar graph; the entire job can preferably be displayed forward or backward in time by depressing function keys;

screens showing each parameter plotted versus time for the entire job or any portion of the job;

a report screen shows numeric values for each point along with the time the point was recorded; and a screen showing a textural log of all alarms and operator actions along with the time of occurrence.

The wireline monitoring/controlling system of the present invention preferably measures and/or calculates the following parameters: pulling force; wire depth; wellhead pressure; and wire running speed.

WireWatch ™ is a division of NPACT ™ (Nitrogen Pumping and Coiled Tubing Specialists, Inc.), P.O. Box 30636, Lafayette, La. 70593. WireWatch ™ provides wireline monitoring systems according to the present invention.

The wireline monitoring/controlling system of the present invention preferably does the following: calculates cycle life of wire, monitors weights being pulled on wire, monitors well head pressure, monitors depth, calculates running speeds on wire, can produce 45 minute trends at the job site for all points being measured, sounds alarms if any function goes over safety limits, utilizes NEMA 4× weatherproof enclosed systems, is completely portable from rig to rig, and enables monitoring of a job from a remote location over a communications link (e.g., using a modem and cellular telephone).

Benefits of the wireline monitoring/controlling system of the present invention are: it can eliminate expensive and unnecessary workovers; it can automatically record and track total runs on wire; it can plot cycles versus depth to indicate wire wear in certain spots; it can plot trends for well head pressure equalization when pulling equalizing prongs to prevent being blown up the hole; it can sound an alarm if too much weight is being pulled on the wire; it can provide a complete record of all jobs to be maintained for future reference; and it can enable a complete playback of job in bar graph, text, or trend plot format.

FIG. 1 shows the system 10 of the present invention, including a portable NEMA 4X weatherproof container 11 housing a 386-SX PC computer 12 having a VGA EL display and TouchScreen. The computer 12 is operationally connected to a keyboard 13, a modem 14, and a portable signal processing unit 15, which is preferably weatherproof. Portable signal processing unit 15 is electrically connected to a source 16 (such as a battery) of electricity and a depth counter sensor 17 which determines the depth of the lower end of the wireline. Unit 15 includes a signal conditioner 18 and a pneumatic compartment 19, and a DC-DC power supply 20.

Container 11 and unit 15 each include a handle 21 for ease of transportation.

Operatively connected to pneumatic compartment 19 of unit 15 are valves 22 and 23 which are respectively connected to hydraulic weight determining means and wellhead pressure determining means.

Figure 5:
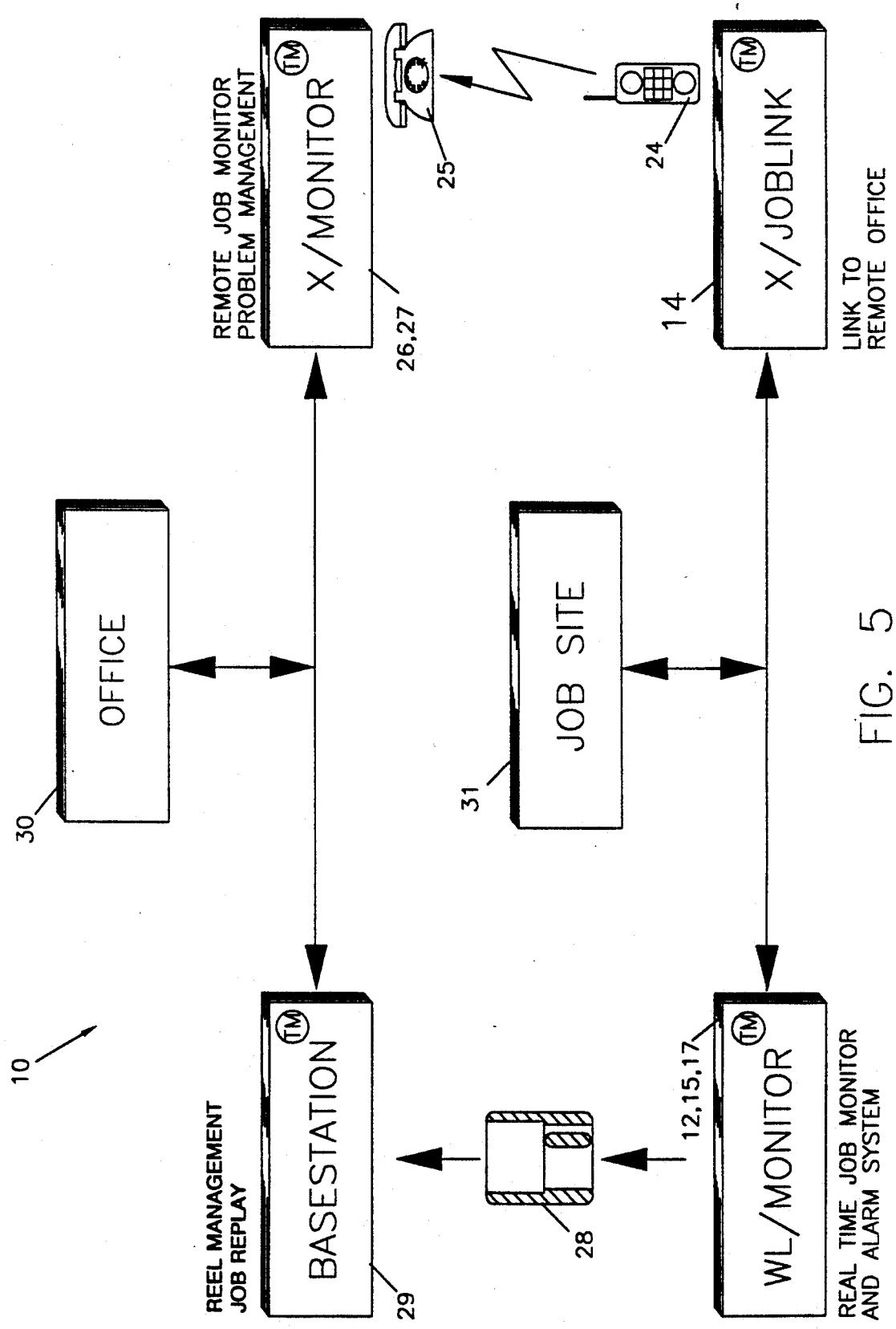
FIG. 5 is a schematic diagram showing the interaction of various elements of the present invention.

Modem 14 is preferably attached to a cellular telephone 24 and can communicate with a second modem 26 via telephone 24 and a telephone 25 attached to second modem 26. Modem 26 is in turn connected to a remote PC computer 27. Thus, any information being monitored by computer 12 can be simultaneously monitored by the remote PC computer 27, perhaps at an office 30 (see FIG. 5) which monitors several jobsites at one time.

At office 30 there can be a base station 29 which can process all the information gathered at the job site 31. Information can be transferred from job site 31 to office 30 via modems 14, 26 or via diskettes such as diskette 28.

Figure 2:
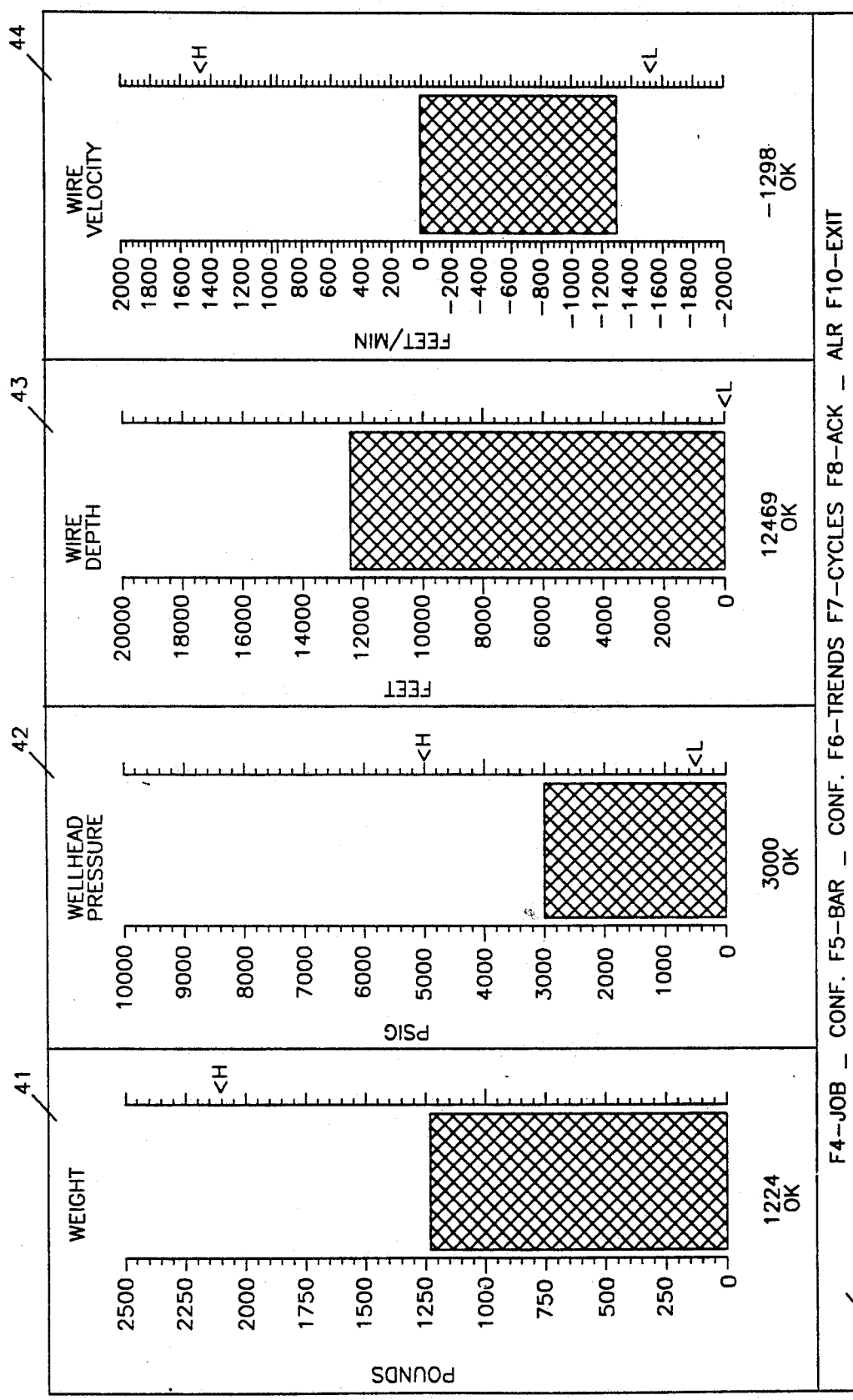
FIG. 2 is a display showing various bar graphs.

FIG. 2 shows a screen 40 displayable on computer 12. Screen 40 includes, a bar graph 41 showing weight on the wireline, a bar graph 42 which shows wellhead pressure, a bar graph 43 for displaying the depth of the lower end of the wireline, and a bar graph 44 for showing the velocity of the wireline.

Figure 3:
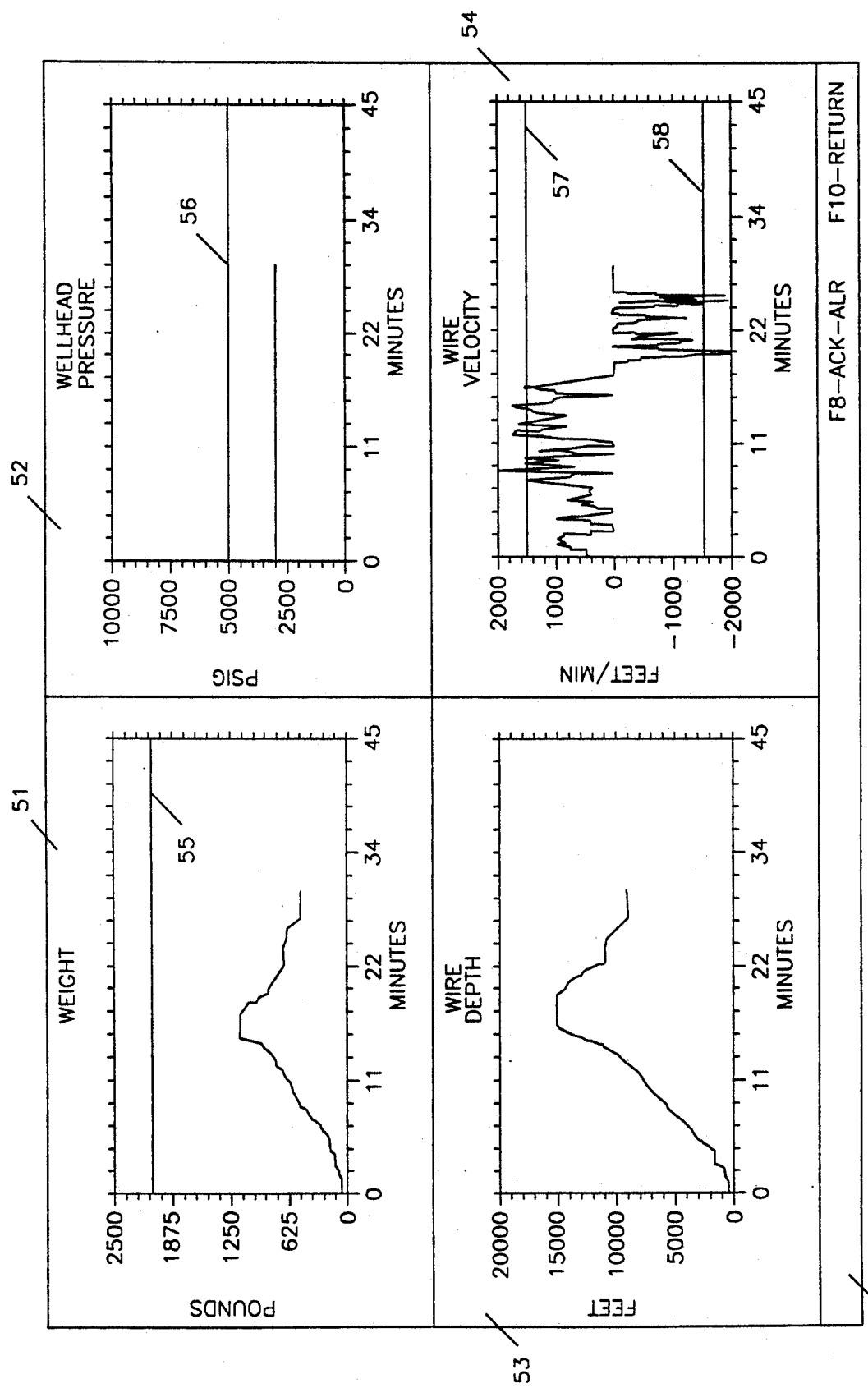
FIG. 3 is a display showing the parameters shown in FIG. 2 as a function of time.

FIG. 3 shows a screen 50 which is displayable on computer 12. Screen 50 includes a 45-minute trend plot 51 showing weight on the wireline (the maximum allowable value is shown at 55), a 45-minute trend plot 52 showing wellhead pressure (the maximum allowable value is shown at 56), a 45-minute trend plot 53 showing the depth of the lower end of the wireline, and a 45-minute trend plot 54 showing the velocity of the wireline (the maximum desirable velocity is shown at 57 and the minimum desirable velocity is shown at 58).

Figure 4:
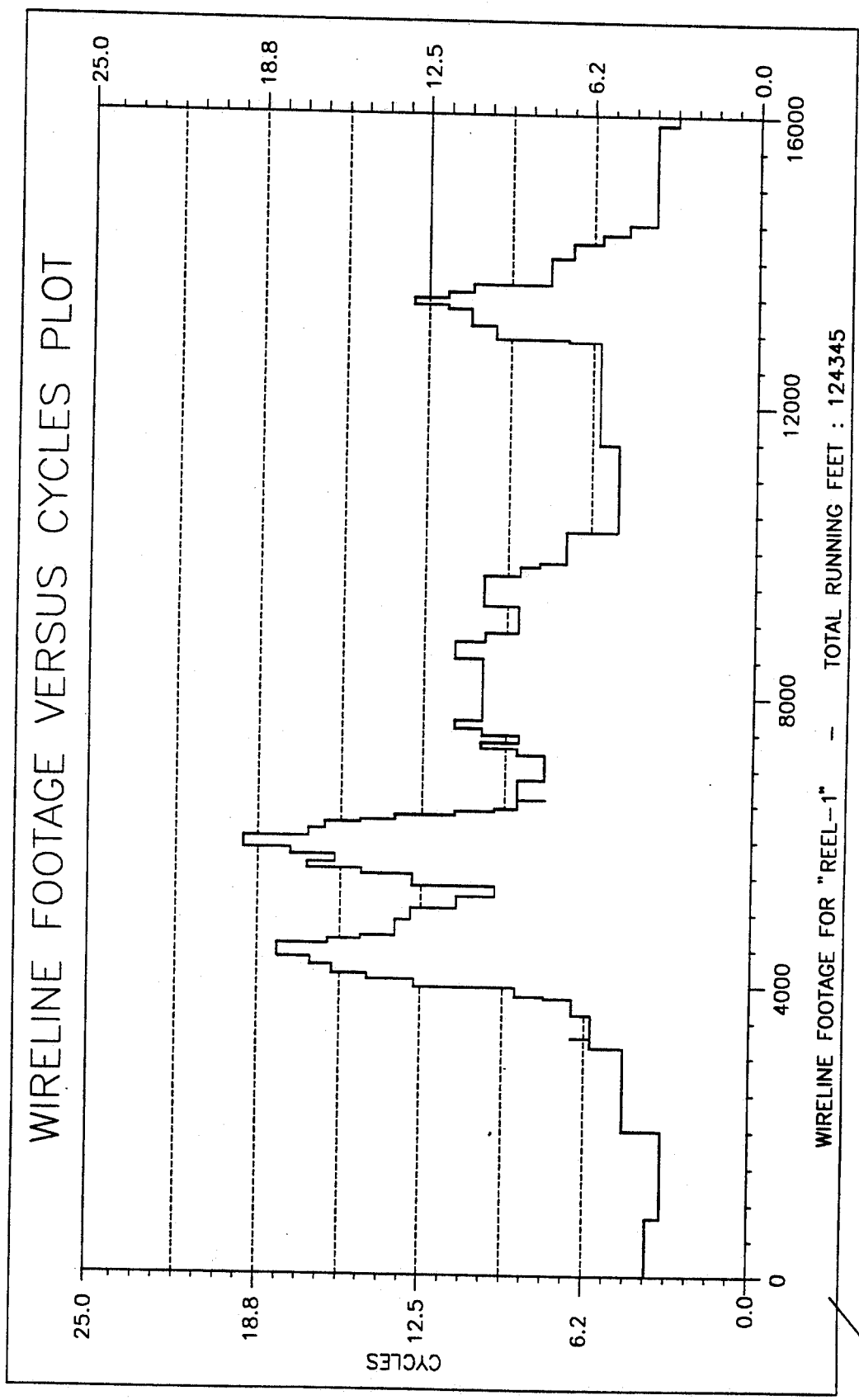
FIG. 4 is a plot showing the amount of cycles at various points along the wireline.

FIG. 4 shows a screen 60 which can be displayed on computer 12. Screen 60 displays the number of cycles as a function of position on the wireline (for example, screen 60 shows that the part of the wireline about 6000 feet from the end has been cycled about 19 times.

Figure 6:
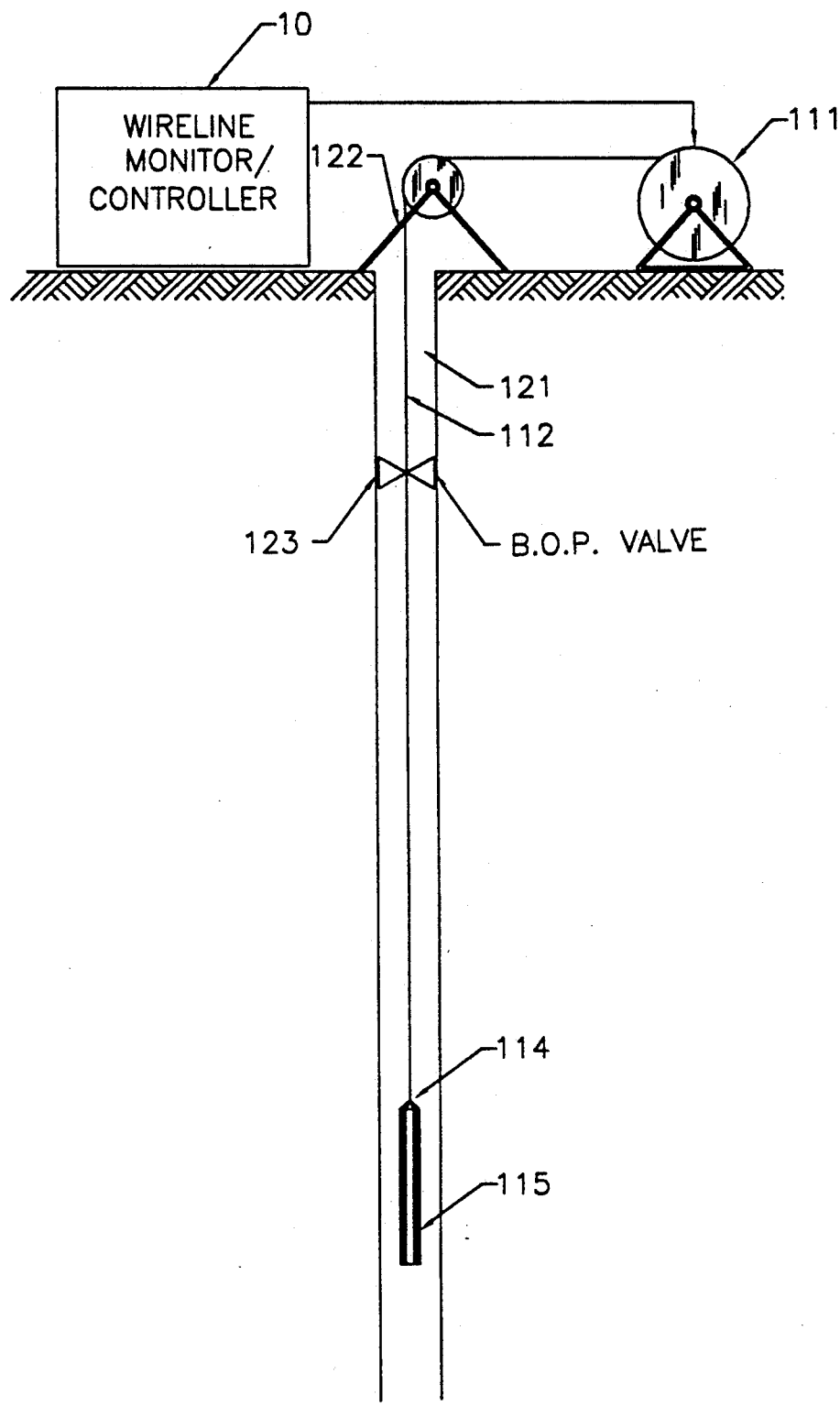
FIG. 6 is a view of a wireline monitor/controller for monitoring and controlling a wireline unit.

FIG. 6 shows wireline monitor/controller 10 for monitoring and controlling a wireline unit 111 in the field. Wireline unit 111 includes a wireline 112 connected to wireline unit 111. Wireline 112 has an upper end, a lower end 114, a rated weight, and a wireline tool 115 attached to its lower end 114. Wireline 112 is run down a well bore 121 during a wireline job, well bore 121 having an upper end 122 and a blow-out-preventer valve 123 through which wireline 112 passes.

In operation, the system 10 of the present invention is transported to the job site 31. Depth sensor counter 17 is operatively connected to a wireline (not shown) of a wireline unit (not shown), and some means (not shown) for monitoring the weight on the wireline is operatively connected to computer 12. Some means for measuring hydraulic weight and wellhead pressure are operatively connected to pneumatic compartment 19. As the wireline (not shown) is lowered into the well (such as an oil well, not shown), the operator (not shown) of system 10 can view any of screens 40, 50, or 60. Should the weight on the wireline exceed a predetermined weight, an alarm goes off. The alarm may include audio and visual components and may include an automatic shutdown which stops some functioning of the wireline unit. A similar alarm can be used when wellhead pressure or wireline velocity exceeds a predetermined value or when a predetermined number of cycles is approached or exceeded by a portion of the wireline in the well.

Depth counter sensor 17 monitors the lower end of the wireline so that a b.o.p. valve will not close on the wireline and so that a wireline tool attached to the lower end of the wireline is not inadvertently pulled off of the lower end of the wireline when the lower end of the wireline reaches the upper end of the well bore or some obstruction in the well. Sensor 17 could be operatively connected to means for closing the b.o.p. valve or the wireline unit so that the b.o.p. valve is automatically prevented from closing or the wireline unit is automatically prevented from pulling up the wireline when sensor 17 indicates that the end of the wireline is or is not in a predetermined position.

The foregoing embodiments are presented by way of example only; the scope of the present invention is to be limited only by the following claims.

I claim:

1. Apparatus including a wireline monitor/controller for monitoring and controlling a wireline unit including a wireline connected to the wireline unit, the wireline having an upper end, a lower end, a rated weight, and having a wireline tool attached to its lower end, the wireline being run down a well bore during a wireline job, the well bore having an upper end, the monitor/controller comprising:

(a) first alarm means for giving an alarm at a predetermined percentage of cycle life of the wireline;

(b) display means to give a reading of the percentage of cycle life at any point on the wire;

(c) second alarm means for indicating when the weight on the wire exceeds the rated weight of the wire;

(d) logging means for logging well head pressure in the well bore;

(e) monitoring means for monitoring the location of the lower end of the wireline to prevent a blow-out-preventer valve from closing and cutting the wireline and to prevent a wireline tool from being pulled off of the lower end of the wireline when the lower end of the wireline reaches the upper end of the well bore;

(f) velocity monitoring means for monitoring the velocity of the wireline; and (g) shut-down means for shutting down the wireline unit in response to any of the measurements which the monitor/controller makes.

2. The apparatus of claim 1, further comprising:

modem means for linking the wireline monitor/controller with a computer at a location remote from the wireline job.

3. Apparatus including a wireline monitor/controller for monitoring and controlling a wireline unit including a wireline connected to the wireline unit, the wireline having an upper end, a lower end, a rated weight, and having a wireline tool attached to its lower end, the wireline being run down a well bore during a wireline job, the well bore having an upper end, (a) the monitor/controller comprising:

a monitor for monitoring the location of the lower end of the wireline to prevent a blow-out-preventer valve from closing and cutting the wireline and to prevent a wireline tool from being pulled off of the lower end of the wireline when the lower end of the wireline reaches the upper end of the well bore;

(b) the apparatus further comprising first alarm means for giving an alarm at a predetermined percentage of cycle life of the wireline.

4. The apparatus of claim 3, further comprising:
modem means for linking the wireline monitor/controller with a computer at a location remote from the wireline job.

5. The apparatus of claim 3, further comprising:
display means to give a reading of the percentage of cycle life of the wireline at any point on the wire.

6. The apparatus of claim 3, further comprising:
alarm means for indicating when the weight on the wire exceeds the rated weight of the wire.

7. The apparatus of claim 3, further comprising:
logging means for logging well head pressure in the well bore.

8. The apparatus of claim 3, further comprising:
velocity monitoring means for monitoring the velocity of the wireline.

9. The apparatus of claim 3, further comprising:
shut-down means for shutting down the wireline unit in response to any of the measurements which the monitor/controller makes.

10. Apparatus including a wireline monitor/controller for monitoring and controlling a wireline unit including a wireline connected to the wireline unit, the wireline having an upper end, a lower end, a rated weight, and having a wireline tool attached to its lower end, the wireline being run down a well bore during a wireline job, the well bore having an upper end, the monitor/controller comprising:

alarm means for indicating when the weight on the wire exceeds the rated weight of the wire.

11. The apparatus of claim 10, further comprising:
modem means for linking the wireline monitor/controller with a computer at a location remote from the wireline job.

12. The apparatus of claim 10, further comprising:
alarm means for giving an alarm at a predetermined percentage of cycle life of the wireline.

13. The apparatus of claim 10, further comprising:
display means to give a reading of the percentage of cycle life of the wireline at any point on the wire.

14. The apparatus of claim 10, further comprising:
logging means for logging well head pressure in the well bore.

15. The apparatus of claim 10, further comprising:
velocity monitoring means for monitoring the velocity of the wireline.

16. The apparatus of claim 10, further comprising:
shut-down means for shutting down the wireline unit in response to any of the measurements which the monitor/controller makes.

17. The apparatus of claim 10, further comprising:
monitoring means for monitoring the location of the lower end of the wireline to prevent a blow-out-preventer valve from closing and cutting the wireline and to prevent a wireline tool from being pulled off of the lower end of the wireline when the lower end of the wireline reaches the upper end of the well bore.

* * * * *